Feb. 10, 1931. T. PHILLIP ET AL 1,792,321
PORTIONING AND STORING MACHINE
Filed March 29, 1928  3 Sheets-Sheet 1
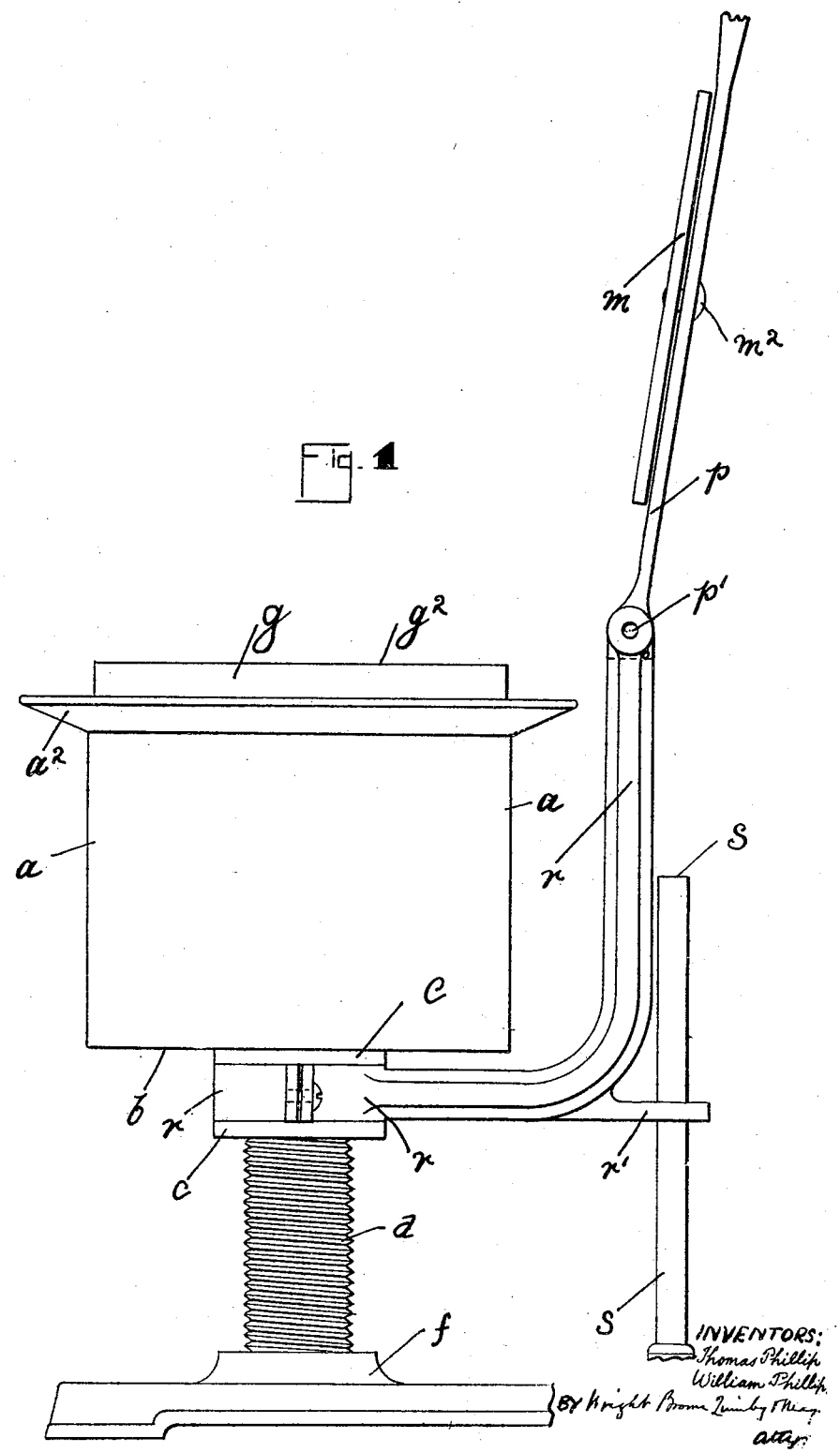

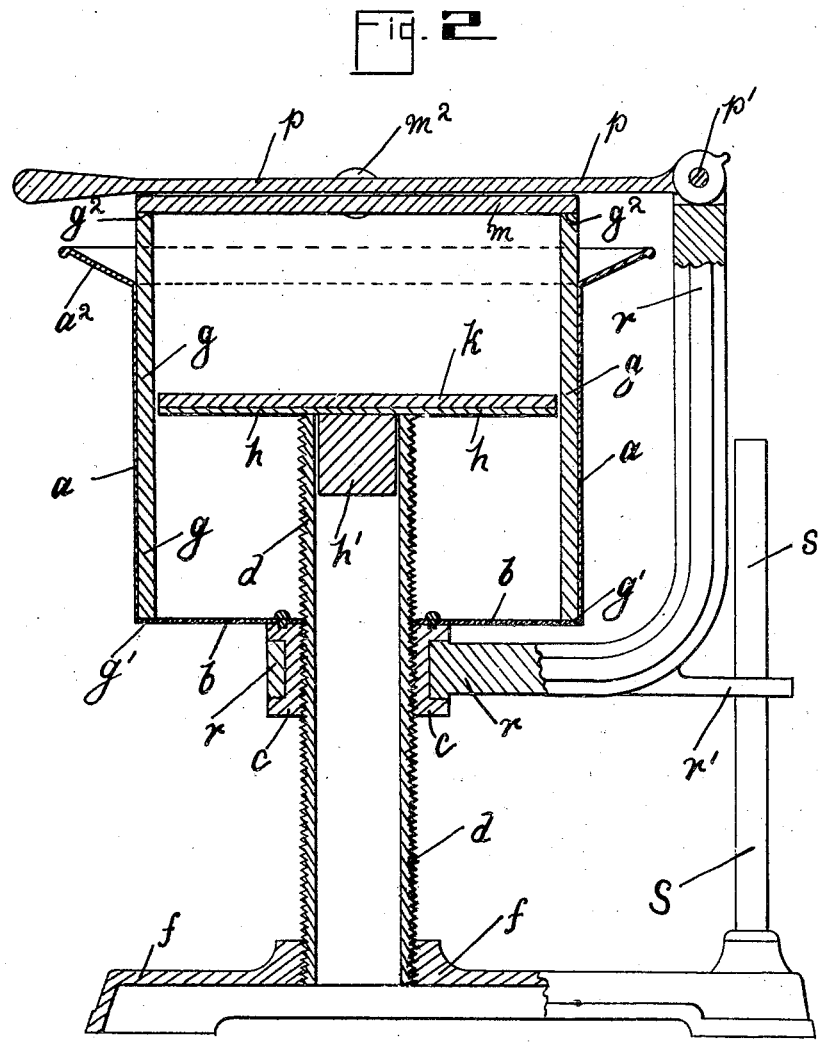

Feb. 10, 1931.   T. PHILLIP ET AL   1,792,321
PORTIONING AND STORING MACHINE
Filed March 29, 1928   3 Sheets-Sheet 3
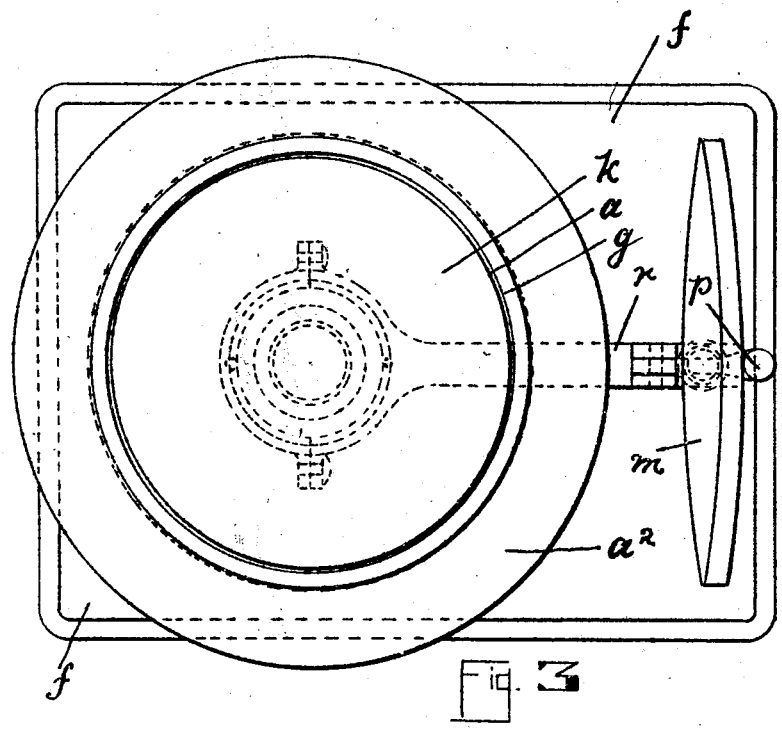
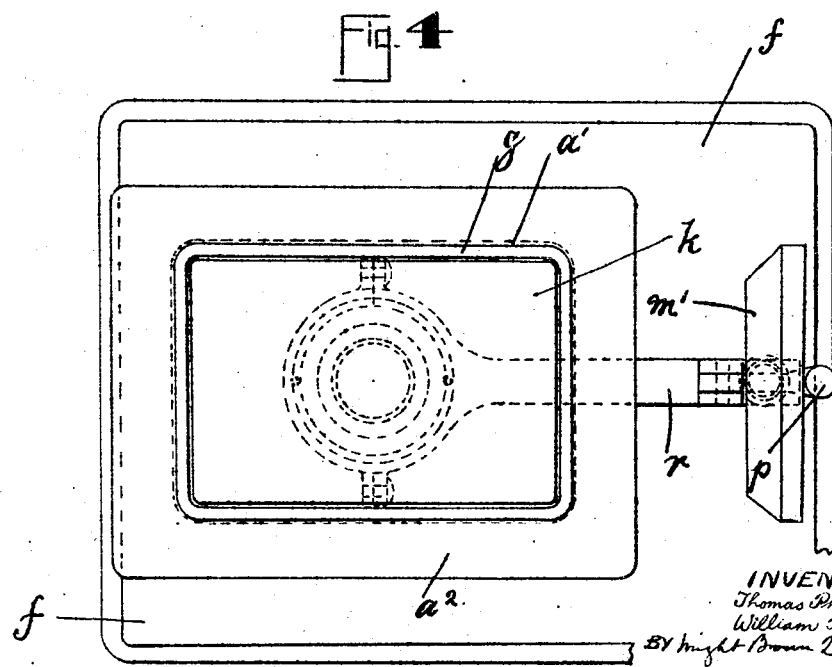

Patented Feb. 10, 1931

1,792,321

UNITED STATES PATENT OFFICE

THOMAS PHILLIP AND WILLIAM PHILLIP, OF SKIPTON, ENGLAND, ASSIGNORS TO JOHN WILLIAM CHEETHAM, OF BOLTON, ENGLAND

PORTIONING AND STORING MACHINE

Application filed March 29, 1928, Serial No. 265,714, and in Great Britain April 9, 1927.

In the portioning and storing of preserved or tinned meats such as tinned tongues and the like it is desirable to protect said meat (after it has been discharged from its original tin or container) so that undersirable germs of disease or other foreign matter are prevented from coming in contact with said meat which at the same time it is also desirable to have it protected under such conditions as will enable it to be cut into slices for use. Our present invention consists in the production of apparatus formed to receive the body of material, such as meat or the like which is being discharged from its usual tin or other container, and when thus received to protect same from atmospheric contact except in so far as to permit the cutting or slicing of same preparatory to its sale or consumption and then only exposing the least possible portion thereof.

In order that our said invention may be readily understood we have hereunto appended sheets of drawings illustrative thereof to which by figures and letters reference is made in the following description:—

Fig. 1 is a side elevation of apparatus produced in accordance with our invention.

Fig. 2 is a sectional side elevation of the same apparatus.

Fig. 3 is a plan of the apparatus shown by Figs. 1 and 2.

Fig. 4 is a plan showing an angular vessel instead of a cylindrical one as is shown by the other figures.

To attain the object of our invention we make use of a vessel or outer member $a$ preferably of cylindrical shape as shown by Figs. 1, 2 and 3 although we may have it of angular shape as is shown at $a^1$ Fig. 4.

This vessel $a$ has its base $b$ fixed by screw or otherwise to a nut or base part $c$. This nut $c$ is screwed upon the hollow pillar $d$ which is fixed upon the supporting base $f$, either by said fixing being effected by its being screwed therein as is shown by the drawings, or otherwise.

Within the vessel or outer member $a$ we place a detachable sterilizable lining member $g$ which is open at both its lower and upper ends and this lining $g$ is preferably of glass although porcelain or other sterilizable material may be made use of in its production.

The lower edge $g^1$ of the lining $g$ rests upon the base $b$ of the outer member $a$.

A platen surrounding and supported in a predetermined position by the pillar $d$ comprises a sterilizable outer member $k$ resting upon and covering an inner member $h$ bearing on the pillar. The inner member $h$ has a projection or hub part $h^1$ extending into the pillar $d$. The member $k$ is preferably of glass although porcelain or other suitable sterilizable material may be used.

The upper edge of the vessel $a$ has an appropriately formed flange $a^2$ which extends radially from it to form a hand grip by which rotary motion may be given to said vessel $a$ in order to cause the screwed hub or nut $c$ to move over the screw threads on the vertical hollow pillar $d$ by which means the said vessel $a$ may be made to rise and descend over said screwed pillar $d$ and to carry with it the detachable sterilizable lining $g$ so that same will extend more or less above the disc or outer member $k$ of the platen within it, since said outer member $k$ will be supported at the upper end of the hollow pillar $d$ by resting on the inner member $h$ as is shown by Fig. 2.

As means for covering the outer edge or upper surface of the lining $g$ we make use of a sterilizable plate or member $m$ (preferably also of glass although other material may be made use of) and according to one arrangement, as we show by the drawings, this plate $m$ is pivotally mounted upon a handle $p$ which is pivoted at $p^1$ to a vertical support $r$.

This support $r$ reaches down so that it may be made to span the grooved nut $c$ which is screwed upon the pillar $d$ and this is effected by the said support $r$ having its outer end formed to span said nut $c$ as is shown by the drawings.

The extending part $r^1$ of the support $r$ is made to take over a guiding pillar $s$ which is fixed to the base part $f$, thus as the vessel is caused to rise and descend over the pillar $d$ by the screw actions above described, so also will rise and descend the support $r$, its handle $p$ and the sterilizable member $m$ and this arrangement we find most suitable on account of the parts being connected together so that the whole apparatus is at all times complete and intact.

On the other hand it is obvious that the covering member $m$ might be mounted on a chain, cord or the like, arranged to take over a guiding pulley to have a counterbalancing weight placed thereon if and when desired.

As is before stated, when the apparatus has to be used for receiving the body of material (such as cooked tongues) from cylindrical containers, then the storage space, formed by the lining $g$ and the platen $k$, is cylindrical and of suitable size to receive said tongues when removed from their said ordinary containers. However, where pressed beef or pressed meat of other kinds or vegetables are to be used the storage space may be more of a rectangular formation as shown by the plan Fig. 4, in which case the lid or cover $m^1$ will be of the shape corresponding to the rectangular shape of the vessel $a^1$ but with the flutings and arrangements in connection with the other shape of the vessel.

On the user taking a tin of meat or the like that has to be placed within the lining $g$ of the outer member $a$, when he has cut open said tin he then may turn the tin over so that the contents will descend down into the vessel $a$ to rest upon the platen $k$ within the same, at which time he will have the member $a$ rotated so that it will be raised high enough above the platen $k$ for the upper edge $g^2$ of the sterilizable lining member $g$ to be above the upper surface of the contents resting on the platen $k$.

In placing the meat or body of material within the lining $g$ as above described, the lid $m$ may then be brought into position where it will fit over the upper edge $g^2$ to keep same practically air-tight, as the greasy or fatty matter at the upper edge of the lining $g$ enables this to be effected, since we allow sufficient looseness of the fitting of the member $m$ upon its pivotal support $m^2$ to permit said plate to accommodate itself to any irregularities that may exist between the cover $m$ and the upper knife-guiding edge or mouth $g^2$ of the lining $g$.

On the user desiring to supply some of the body of material from the storage space he then raises the lid $m$ into the position shown by Fig. 1 where it is retained by the handle $p$ being shaped to engage with the supporting member $r$ and he will then rotate the vessel $a$ so as to lower same sufficiently far to permit the lining $g$ to descend below the upper surface of the contents resting upon the member $k$ as is necessary to enable him to carry his knife in engagement with the upper guiding edge or mouth $g^2$ of the lining $g$ to cut through the protruding portion of the body of material in the storage space crosswise through the whole area. Thus by regulating the height that the edge $g^2$ of the lining $g$ should be below the upper surface of the contents resting upon the member $k$ he may regulate the thickness of slice that he is going to cut away as his knife is guided and controlled by the guiding edge $g^2$ of the ling $g$.

As the contents are thus cut away so will the user continue to cause the vessel $a$ and its lining $g$ to descend in step by step actions until the whole contents have been exhausted.

The flange $a^2$ of the container $a$, in addition to answering the purpose of a hand grip for rotating the container $a$, acts as a receiver and support for any fragments detached from the body by the severing knife.

It will be observed that when the user rotates the member $a$ under the conditions shown by Figs. 1, 2 and 3 where said container is cylindrical or of circular formation, the lining $g$ will also rotate with said member $a$ whereas the platen $k$ and base $h$ which it rests upon, may not rotate since they will be resting upon the upper end of the fixed supporting screwed pillar $d$.

On the other hand when the vessel $a^1$ is somewhat rectangular or other shape than cylindrical as shown by Fig. 4 then when the vessel $a^1$ is rotated so also will rotate the platen $k$ and base piece $h$ that are within it but still the same advancing and receding actions on the part of the lining $g$ and the vessel $a^1$ will carry out the functions desired.

Such being the nature and object of our invention what we claim is:—

1. A portioning and storing machine comprising a movable container having a nut fixed to its bottom, a vertical screw-threaded pillar on which said nut may rotate to adjust the container, a platen resting on the upper end of the pillar, a base to which the pillar is fixed, an arm having at one end a bearing in which the nut is rotatable to simultaneously adjust the container and arm, a lever pivoted to the opposite end of said arm, and a cover mounted on said lever.

2. A portioning and storing machine as specified by claim 1, comprising also a guiding pillar fixed to said base and engaged with said arm to guide the same in a predetermined path.

THOMAS PHILLIP.
WILLIAM PHILLIP.